United States Patent [19]

Hunerwadel

[11] Patent Number: 4,535,748
[45] Date of Patent: Aug. 20, 1985

[54] CHARCOAL GRILL

[76] Inventor: Moritz H. Hunerwadel, 2186 Collins Dr., NW., Atlanta, Ga. 30318

[21] Appl. No.: 644,613

[22] Filed: Aug. 27, 1984

[51] Int. Cl.³ .............................................. A47J 37/00
[52] U.S. Cl. .................................. 126/25 R; 126/25 B; 99/425
[58] Field of Search ...................... 126/25 R, 25 B, 26, 126/8, 147, 148, 152 R, 152 B, 165; 44/41; 220/20; 229/28 R; 206/45.33; 99/446, 447, 339, 422, 425

[56] References Cited

U.S. PATENT DOCUMENTS

| | | | |
|---|---|---|---|
| 3,191,591 | 6/1965 | Bennett | 126/25 R |
| 3,245,398 | 4/1966 | Baker | 126/25 R X |
| 3,279,453 | 10/1966 | Norehad et al. | 126/25 B |
| 3,353,527 | 11/1967 | Anderson | 126/25 R |
| 3,556,076 | 1/1971 | Stewart | 126/25 R X |
| 3,598,102 | 8/1971 | Fuss | 126/25 R |
| 3,684,087 | 8/1972 | Anderson | 126/25 R X |
| 4,290,408 | 9/1981 | Juett et al. | 126/25 R |

*Primary Examiner*—Larry Jones
*Attorney, Agent, or Firm*—Thomas & Kennedy

[57] ABSTRACT

A charcoal grill has a solid bowl member formed with a set of indentations in which charcoal briquettes may be individually placed, burned and the ashes therefrom collected. A wire mesh grill member is supported above the bowl.

3 Claims, 6 Drawing Figures

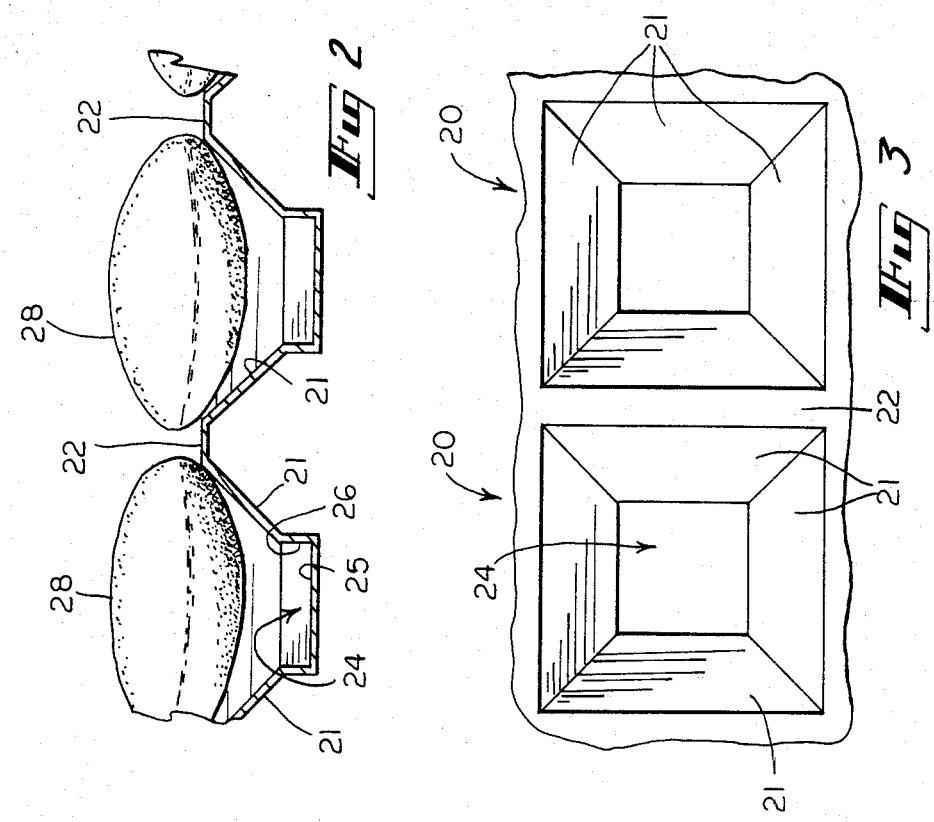
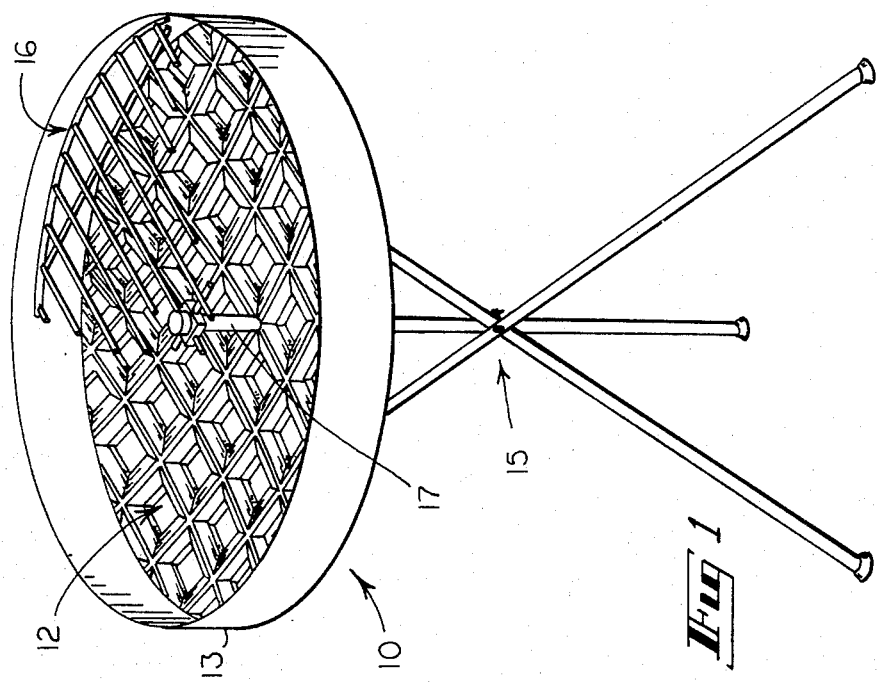

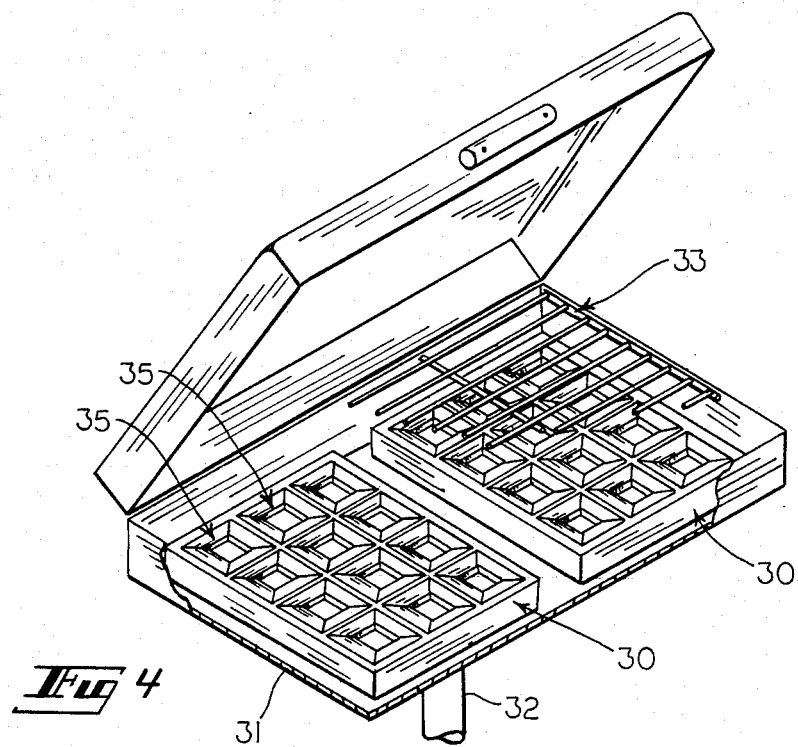
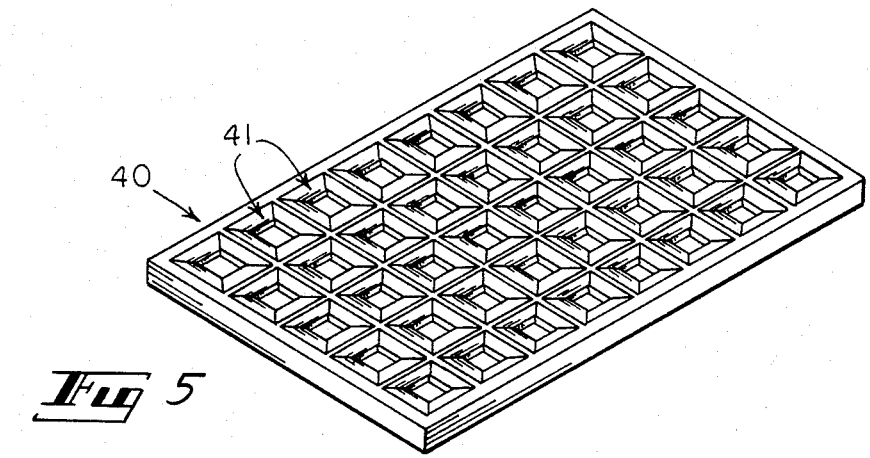
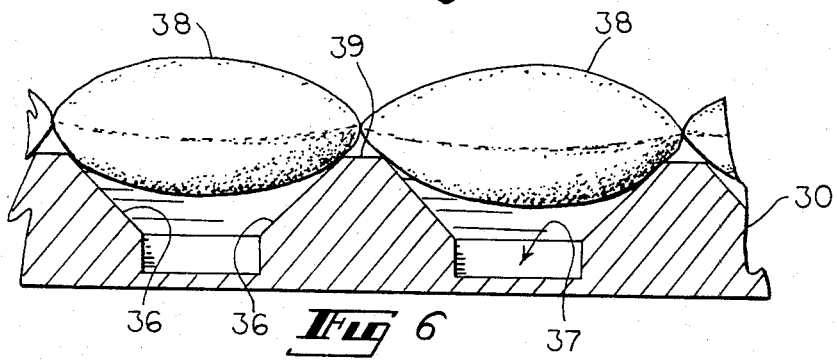

CHARCOAL GRILL

TECHNICAL FIELD

This invention relates to charcoal grills like those commonly used in cooking meats such as steaks, ribs and the like at private homes and apartments.

BACKGROUND OF THE INVENTION

Charcoal grills are often constructed with a basin or bowl in which a supply of charcoal briquettes is held and a wire mesh grill supported above the bowl upon which foodstuffs may be placed for cooking. In use, a supply of charcoal briquettes is poured into the bowl with the grill removed, the briquettes wetted with a flammable fluid, and the fluid then ignited. Once the briquettes begin to burn well, they are spread across the floor of the bowl and the wire mesh grill then positioned above them. When the briquettes have burned sufficiently to produce a desired cooking temperature, foodstuffs such as meats are placed upon the grill and cooked.

Heretofore, the just described charcoal grills have had certain problems associated with their use. For example, the random positioning of the briquettes in the bowl has provided an uneven source of heat so that some foodstuffs become cooked more rapidly than others positioned there beside. Where adjacent briquettes overlay one another, hot spots tend to develop which causes flareups and flames both from their self-produced heat as well as from fat drippings falling thereon. This tends to char the foodstuffs producing a taste and texture that is disliked by many people.

The just described problems associated with unevenesss of heating and with flareups from hot spots have been alleviated by charcoal supports which position charcoals in an organized manner. Exemplary of such supports are those disclosed in U.S. Pat. Nos. 3,191,591 and 3,245,398. By regularly spacing the individual charcoal briquettes, hot spots are prevented from occurring. These supports, however, have also had problems associated with their use and have failed to find commercial acceptance. For example, to insure good circulation of air for combustion, and to drain fluids away from the briquettes, the supports with regularly spaced recesses have either been formed of wire mesh materials or with solid materials that are provided with drains. Thus, they have been independent structures designed for placement within grill bowls above the bowl floors. Being an additional element of a charcoal grill, however, grills that employ this type of briquette support have been relatively complex, expensive and difficult to clean. Were a charcoal grill to be devised which would retain the benefits of such supports but without their attendant problems, a definitive advance in the art would be achieved. It is to the provision of such as improvement in charcoal grills that the present invention is primarily directed.

SUMMARY OF THE INVENTION

In one form of the invention, a charcoal grill has a solid sheet metal bowl member formed with a set of indentations in which charcoal briquettes may be individually placed, burned and the ashes therefrom collected. The charcoal grill also has a wire mesh grill member supported above the bowl member.

In another form of the invention, a charcoal grill has a fluid impervious metallic base formed with recesses in which rounded charcoal briquettes may be supported at a plurality of contact points, burned and the ashes therefrom collected in cooking foodstuffs supported above the base.

BRIEF DESCRIPTION OF THE DRAWINGS

FIG. 1 is a perspective view of a charcoal grill embodying principles of the present invention.

FIG. 2 is a cross-sectional view of a portion of the bowl member of the charcoal grill illustrated in FIG. 1 shown supporting charcoal briquettes.

FIG. 3 is a plan view of the portion of the bowl member illustrated in FIG. 2 shown without the briquettes.

FIG. 4 is a perspective view of a charcoal grill embodying principles of the invention in an alternative form.

FIG. 5 is a perspective view of yet another embodiment of the invention.

FIG. 6 is a cross-sectional view of a portion of the charcoal grill shown in FIGS. 4 and 5, this portion of the two grills being the same.

DETAILED DESCRIPTION

With reference next to the drawings, there is shown in FIG. 1 a charcoal grill 10 having a bowl or basin indicated generally at 12 surrounded by an upright, circular sidewall 13. The bowl is supported at a height above supporting terrain by three crossed legs 15. A wire mesh grill 16 is supported upon an upright central post 17 above the bowl. The wire mesh grill 16 is adjustable in height by conventional adjustment means which is not shown here for clarity of illustration. The bowl 12 of the charcoal grill is slightly concave whereby the post 17 extends from the lowermost point of the bowl while the sidewall 13 projects upwardly from the uppermost level of the bowl about its periphery.

With reference to FIGS. 1-3, the bowl 12, which is comprised of sheet metal material, is formed as with a press so as to have an array or set of square indentations or recesses in a checkerboard pattern. As best shown in FIGS. 2 and 3, each recess or indentation 20 has four flat, inclined walls 21 which slope downwardly from a flat lip 22 to a sump indicated generally at 24. The sump has a planar, bottom floor 25 oriented parallel to lip 22 from which four upright walls 26 extend to merge with the bottoms of the inclined walls 21.

In use, charcoal briquettes 28, which are conventionally of a rounded, oblong shape, are positioned individually within the recesses 20, as shown in FIG. 2, with their rounded edges making point contacts with the inclined walls 21. Preferably, the recesses are dimensioned so as to locate adjacent briquettes no greater than ¼ inch apart to maximize the evenness of heating provided to the wire mesh grill 16. Point contacts are effected by the provision of the flat walls 21 for tangential, support engagement with the rounded surfaces of the briquettes. With merely point contacts being made, ample space is provided for air to circulate around and beneath the briquettes within the recesses. With the provision of the sumps, fluids and ash residue from the briquettes may collect in spaced relation beneath the briquettes during much of their burn so as to insure continued circulation of air thereabout while they burn. Once the briquettes have burned down to a small size such spacing is no longer provided. However, by this time cooking will ordinarily have been completed. Since the recesses and the sumps are formed of solid metal there is no drainage or residue of fluids or ashes from them onto the terrain beneath the grill. As the array of recesses is formed as an integral part of the bowl itself, the addition of a briquette support, fire grate or the like, as an independent element to be supported above the bowl, is eliminated thereby effecting substantial savings in cost. This integration of the briquette organization means and bowl also facilitates use of the grills for cooking and for simplified cleanings.

With reference next to FIG. 4, a charcoal grill is shown in an alternative form to include two bases 30 which are adapted to be placed directly upon a grill floor 31 that is supported by a post 32 above unshown terrain. Again, a wire mesh grill element 33 is supported above the base by unshown support means. As best shown in FIG. 6, each of the bases is formed with an array or set of recesses similar to that described in FIGS. 1 and 3. Here, however, the base is of a cast metal such as iron and thus is solid rather than being of thin, sheet metal construction. In FIG. 4, two bases 30 are provided with each having twelve recesses 35. Each base may be simply set upon the floor 31 of the grill in use. In FIG. 5, on the other hand, a single base 40 is shown having forty eight recesses 41 of the same configuration. In FIG. 6 it is seen that individual briquettes 38 are supported within the recesses in point contact with their side walls just below lip 39 and with adjacent briquettes touching one another prior to ignition and burn. Thus the embodiments illustrated in FIGS. 4 and 5 have the previously described advantages with respect to the absence of apertures and drains. Here, however, the bases are adapted to be supported upon an underlying support structure and thus do not have the added benefits of being formed unitarily with the bowl as in the case of the embodiment described in FIGS. 1–3.

It thus is seen that a charcoal grill is provided which overcomes limitations and restrictions of those of the prior art. It should however be understood that the just described embodiments merely illustrate principles of the invention in preferred forms. Many modifications, additions and deletions may be made thereto without departure from the spirit and scope of the invention as set forth in the following claims.

I claim:

1. A charcoal grill having a solid sheet metal bowl member formed with a set of indentations in which charcoal briquettes may be individually placed, burned and the ashes therefrom collected and with each of said indentations having four inclined flat walls upon which a rounded charcoal briquette may be supported at a plurality of contact points which walls incline downwardly from an indentation lip to four upright walls of a sump in which fluids and ashes may be collected, and a wire mesh grill member supported above said bowl.

2. A charcoal grill having a fluid impervious metallic base formed with recesses in which rounded charcoal briquettes may be supported at a plurality of contact points, burned and the ashes therefrom collected in cooking foodstuff supported above the base, and wherein each of said recesses has four flat inclined walls that incline downwardly from a recess lip to four upright walls of a sump that has a substantially planar floor oriented substantially parallel with said lip.

3. A charcoal grill having a fluid impervious, unitary metallic base formed with recesses in which rounded charcoal briquettes may be supported so that briquette residue may be collected thereunder and air circulated under the briquettes and over the collected residue, and with each of said recesses having a plurality of generally flat inclined upper walls that merge with upright sump walls that extend upwardly from a generally flat recess floor.

* * * * *